Oct. 1, 1968  W. SINDZINSKI ET AL  3,403,799
ARRANGEMENT TO LOAD A CONVEYING ROUTE
Filed March 24, 1967  2 Sheets-Sheet 1

INVENTORS
WILLY SINDZINSKI
WOLFGANG STILLER

BY Menotti J. Lombardi Jr.
ATTORNEY 3,403,799
ARRANGEMENT TO LOAD A CONVEYING ROUTE
Willy Sindzinski and Wolfgang Stiller, Berlin, Germany, assignors to International Standard Electric Corporation, New York, N.Y., a corporation of Delaware
Filed Mar. 24, 1967, Ser. No. 625,831
Claims priority, application Germany, Apr. 14, 1966, St 25,236
1 Claim. (Cl. 214—89)

ABSTRACT OF THE DISCLOSURE

An arrangement to load a conveying route, in which a section of the conveying route is removed and replaced by another section for the transfer of articles to the conveying route.

---

If for certain reasons conveying routes, particularly belt-type conveying routes are installed above the working space, e.g. below the ceiling, particular devices are necessary, in order to load such conveying routes. Difficulties then occur when the loading points are not at the end of the conveying route and the articles to be conveyed must be brought into the conveying channel from the side.

This invention relates to a lift leading to the elevated conveying route, whereby the articles to be loaded are lifted to said route with the aid of a cabin or a platform. Accordingly the elevated conveying route to be loaded between its terminating points has a removable or interruptable part, and in order to convey the articles to the elevated conveying route said interrupting part is replaced by the cabin or the platform.

According to a further embodiment of the invention friction rollers are provided, instead of a separate drive of the conveying routes, so that the separate short conveying route and the route of the cabin or platform, are brought in touch with other friction rollers at the elevated conveying route, and thus driven. A supplying belt-type conveying route can be coupled to said conveying route of the cabin or platform in a similar way. When actuating the lift the separate conveying route is removed at the respective point. This is accomplished by the cabin or platform which removes the part of the route from the interrupting point, or swivels it sideward if the space above the conveying route is limited.

Figure 1:
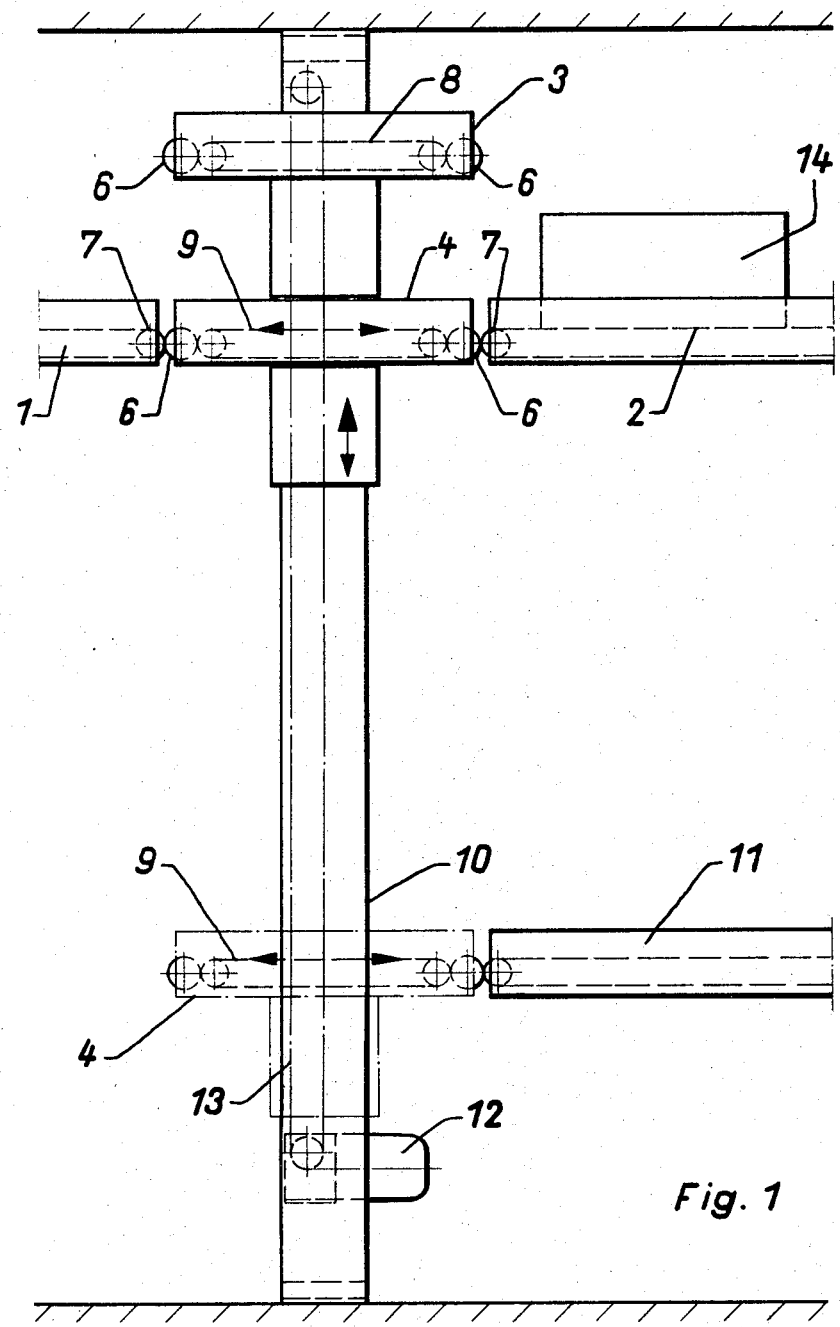
Figure 2:
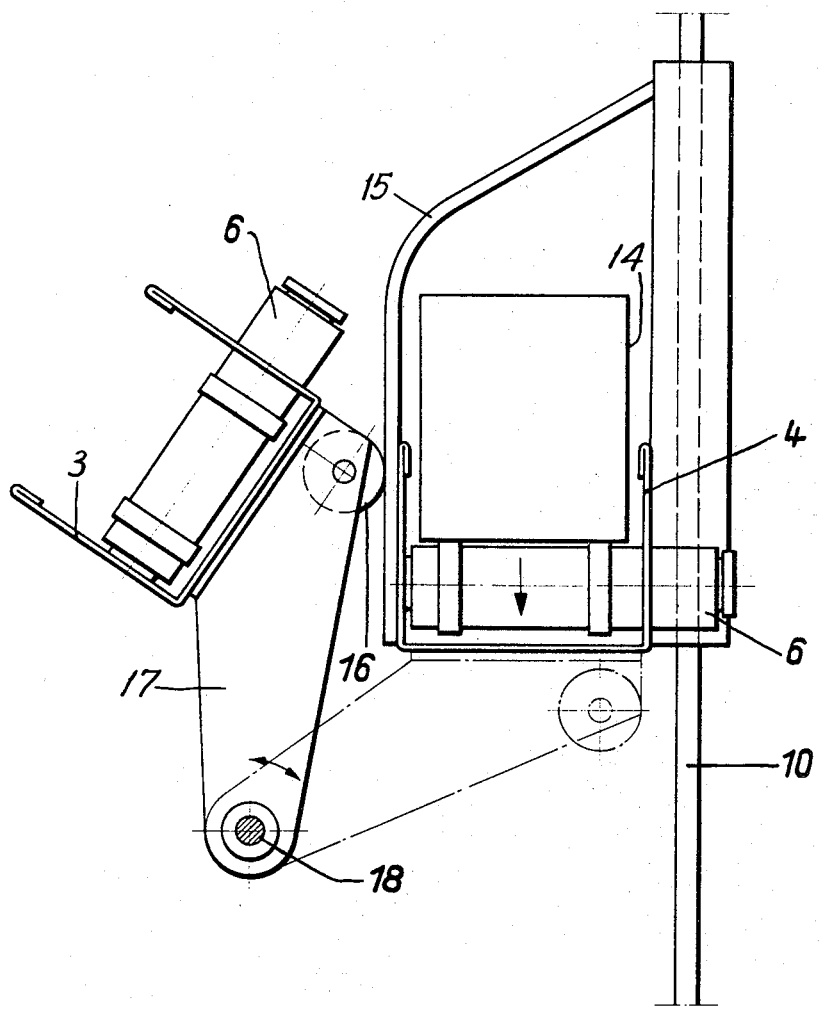

The accompanying drawing serves to explain the present invention, wherein:

FIG. 1 shows the front view of the elevator or lift with the connected conveying routes, and FIG. 2 shows a swiveling device in lateral view, actuated by the cabin or platform.

The elevator column 10 in FIG. 1 runs from the floor to the ceiling of a room. On the operating level a conveying system 11 is provided, leading directly to the cabin 4 or the platform, containing a conveying facility 9. The cabin is driven in the vertical direction by the motor 12 with the aid of a gear and a chain 13. Underneath the ceiling of the room the elevated conveying system 1 and 2 is provided. The conveying direction of the system 1 or 2 can be determined selectively. The interrupting point located between the conveying routes 1 and 2 can be closed by the separate short conveying route 3, if no articles are to be loaded at this point.

The conveying route 3 is equipped with rollers 6 force-lockingly touching the rollers 7 of the conveying systems 1 and 2. The cabin 4 has a similar conveying facility 9. As soon as the elevated cabin 4 (platform) is brought by motor 12 and the chain 13 from the starting position to the level of the interrupting point, it removes the separate short conveying route 3 from the main route.

The conveying device 9 of the elevator cabin 4 (platform) also comes in touch with the driving means of the conveying routes 1 and 2 via friction rollers 6 which transfer their movement to the conveying facility 9. The article 14 is thus removed from the cabin (platform) and transferred to the conveying route 1 or 2. The separate short conveying route 3 is moved upward in its guide along the column 10 by the cabin 4 (platform). When the cabin 4 slides downward the short conveying route 3 moves downward in between the routes 1 and 2, connecting them again.

FIG. 2 shows a construction whereby the separate short conveying route 3 is removed at the interrupting point by swiveling. This construction is used, if the space above the elevated conveying routes 1 and 2 is limited. To this end the cabin 4 is provided with the guide rail 15, touching at its upward movement the roller 16 of the separate short conveying route 3 so that its mounting facility 17 is swivelled around the axle 18, removing the conveying route 3 from the moving direction of the cabin 4.

While we have described above the principles of the invention in connection with specific apparatus, it is to be clearly understood that this description is made only by way of example and not as a limitation to the scope of the invention as set forth in the accompanying claim.

We claim:

1. An apparatus comprising: a first and second spaced endless conveyor means disposed in a common horizontal plane; said first and second endless conveyor means including roller means thereon; elongated vertical guide means mounted between said first and second endless conveyor means; third endless conveyor means movably mounted on said guide means; fourth endless conveyor means mounted on said guide means and movable with and relative to said third endless conveyor means, the length of said third and fourth conveyor means being substantially equal to the space between said first and second conveyor means, power driven roller means mounted on said third and fourth conveyor means and adapted to engage the roller means of said first and second conveyor means to thereby selectively drive said first and second endless conveyor means simultaneously in a first or second direction; said third conveyor means being normally disposed in a coplanar relationship with said first and second conveyor means to form a continuous conveying route between said first and second conveyor means; a loading and unloading station vertically spaced from said first and second conveyor means; said fourth conveyor being normally disposed in substantially coplanar relation ship with said station to receive or deposit a load; means to move said fourth conveyor means along said guide means into substantially coplanar relationship with said first and second conveyor means; the movement of said third conveyor means along said guide means being caused by and responsible to the movement of said fourth conveyor means during its movement in the region of said first and second conveyor means.

References Cited

UNITED STATES PATENTS

| 434,582 | 8/1890 | Corning | 214—16.1 |
|---|---|---|---|
| 1,955,959 | 4/1934 | Harnischfeger et al. | 214—16.1 |
| 2,789,569 | 4/1957 | Davis. | |
| 2,975,882 | 3/1961 | Abbey | 214—89 |
| 3,131,820 | 5/1964 | Creedon | 214—16.1 |
| 3,207,337 | 9/1965 | Abbey | 214—89 |

FOREIGN PATENTS 1,098,912   3/1955   France.

HUGO O. SCHULZ, *Primary Examiner.*

R. B. JOHNSON, *Examiner.*